Fig. 7-a
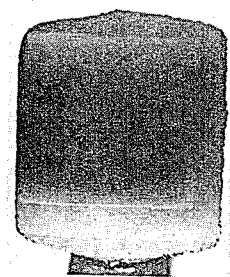
Fig. 7-b
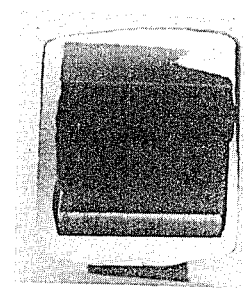
Fig. 8-a
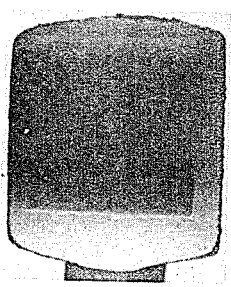
Fig. 8-b
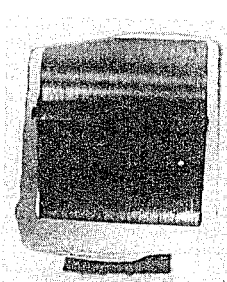

United States Patent Office 3,827,920
Patented Aug. 6, 1974

3,827,920
METHOD FOR FORMING A WEAR-RESISTANT SURFACE ON A METAL ARTICLE
Yasunori Shimoda, Tachikawa, and Kojiro Taniguchi, Iruma, Japan, assignors to Nissan Motor Company, Limited, Yokohama, Japan
Filed Aug. 8, 1972, Ser. No. 278,758
Claims priority, application Japan, Aug. 9, 1971, 46/60,440
Int. Cl. C23c 7/00, 9/00, 11/14
U.S. Cl. 148—15.5
5 Claims

ABSTRACT OF THE DISCLOSURE

A method is disclosed by which a metal workpiece is coated with a wear-resistant layer which is metallically bonded to the surface of the base metal and which is superior in abrasion-resistant ability to the coatings which are formed by prior art methods, wherein the method comprises applying a coating of a self-fluxing alloy on the surface of the base metal and subjecting the coating to nitriding treatment or to nitriding and carburizing treatment.

---

The present invention relates to surface treatment of metal objects and, more particularly, to a method for forming a wear-resistant coating on a metal object.

A wide variety of methods are presently in use by which machine and automotive parts to be subjected to abrasive wear caused by galling and seizing are coated by flame spraying processes with layers of wear-resistant properties which are congruous with different operating ranges and to achieve different surface effects. Materials suitable for this purpose include atomized molten metal, self-fluxing alloys, ceramics and certain kinds of plastics. Where the wear resistant property alone is an important consideration, the molten metal and self-fluxing alloys are usually used although the latter is sometimes preferred.

In the metal spraying process, atomized molten metal is sprayed onto a pre-prepared surface of a metal workpiece so as to produce an abrasion-resistant layer of flattened and interlocked particles which are bonded to the surface of the workpiece. Since, thus, the coating is formed simply by the spraying of the atomized metal followed by no posterior process, pores are produced in the coating and, moreover, the coating is bonded to the surface of the base metal merely in a mechanical fashion, viz, not by fusion. The presence of the pores in the coating results in reduction of the corrosion resistance of the workpieces while the mechanical bond between the coating and the base metal tends to be a cause for the coating being peeled off the base metal.

These drawbacks are eliminated where the self-fluxing alloys are used as the material for the abrasion-resistant coating. In this process, particles of a self-fluxing alloy, such as for example an alloy of nickel, chromium, boron and silicon are sprayed onto the surface of a metal workpiece and the coating thus formed on the workpiece is subjected to melting treatment for melting the particles of the alloy. Porosity in the coating is overcome by this melting treatment, and, furthermore, the coating is bonded by fusion to the surface of the base metal. In this instance, a slug is formed between the silicon constituent in the coating and the oxides present in the base metal and floats on the surface of the coating. This causes the coating to be tightly fused not only to the base metal but in itself so as to eliminate the voids which are usually formed in the coats formed by the spraying method.

The metal object thus prepared with use of the self-fluxing alloys have useful practical applications in numerous quarters of the industry where the requirement for the abrasion-resistant and corrosion-proof properties are not very exacting. In the motor vehicle production industry, for instance, such materials have been successfully used for forming parts which are to be subjected to sliding and frictional motions. There is, however, an ever increasing demand for materials having still improved abrasion and corrosion resistances in the motor vehicle industry so as to meet the requirement for the performance quality of the motor vehicles which is becoming more and more many-sided. It is quite likely that such trend will continue in the future and, as such, the conventional surface treatment using the self-fluxing alloy is becoming obsolete.

It is, therefore, an important object of the present invention to provide an improved method for forming a wear-resistant coating on a metal object to meet the exacting anti-abrasion requirements.

It is another important object of the invention to provide a method by which a metal object is coated with a wear-resistant layer which is bonded by fusion to the surface of a metal object and which is superior in an abrasion-resistant ability to the coatings thus far formed by the prior art methods using the self-fluxing alloys.

These and other objects of the present invention are achieved by a method which basically comprises applying a coating of a self-fluxing alloy to the surface of a base metal and subjecting the resultant coating to nitriding or to both nitriding and carburizing. The base metal operable by this method may be steel, cast iron, cast steel, copper, any one of various copper-based alloys, or a certain type of nickel alloy such as Monel metal. The self-fluxing alloy, on the other hand, may be based on nickel-chromium (Ni-Cr), cobalt (Co), tungsten monocarbide (WC), or cobalt-iron-chromium (Co-Fe-Cr). The coating of the self-fluxing alloy is usually applied to the surface of the base metal by flame spraying of the alloy and the resultant coating is then heated and melted by the use of an oxygas or oxyacetylene torch, by low- or high-frequency induction heating, or in an electric heating furnace. Or otherwise, a layer of the self-fluxing alloy may be further applied to the coating by means of weld-spraying.

The coating thus formed on the surface of the base metal is then subjected to nitriding treatment or to both nitriding and carburizing treatments in an atmospheric furnace or a liquid heat-treatment furnace. Where it is desired to have the coating processed in the liquid heat-treatment furnace or a salt bath, it is preferable that the workpiece is immersed in a liquid medium such as potassium cyanate (KOCN) which is heated to a temperature ranging from 500° C. to 650° C.

Processing a metal object in the salt bath is, in itself, well known in the art and has thus been utilized for the purpose of increasing the resistance to abrasion of an object of iron or an iron-base alloy. The improvement of the abrasion resistance achieved by this process is considered to result from a mechanism which is described below.

When the workpiece of iron or an iron-base alloy is processed in the salt bath, the liquid medium in the bath is decomposed to nitrogen and carbon. The nitrogen and carbon thus produced diffuse internally of the workpiece from the surface thereof, whereupon an upper layer of a whitish compound of a depth of approximately 10 to 20 microns is formed at the surface of the workpiece. This layer contains therein nitrogen and an appreciable amount of carbon in the forms of triferro mononitride ($Fe_3N$), tetraferro mononitride ($Fe_4N$) and triferro carbide ($Fe_3C$). The nitrogen which is present underneath this particular layer is supersaturated and dissolved in a solid state in the iron constituent and consequently develops a diffused lower layer which is present in the form of tetraferro nitride with a thickness of from 0.3 to 0.5 mm. The upper and lower layers thus formed on the workpiece lend themselves to raising the abrasion resistance of the base metal of iron or iron-base alloy.

In contrast to the conventional nitriding or carburizing process in the salt bath in which the base metal *per se* is processed, the method according to the present invention is characterized in that not the base metal but the coating on the base metal is processed for nitriding or for both nitriding and carburizing. Since, thus, the nitriding or carburizing process proceeds substantially in the absence of iron which plays an important role in the process or in some cases in the presence of a negligible amount of iron which amounts to about 35 percent at a maximum, the mechanism of the process above described will not be applicable to the processing carried out on the coating of the self-fluxing alloy. When, more specifically, the coating of the self-fluxing alloy is subjected to the nitriding process in the salt bath or in an atmospheric furnace in carrying out the method according to the present invention, formation of the layer of such compounds as the triferro monocarbide, tetraferro mononitride and triferro mononitride as produced in the case of the process of nitriding the iron or iron-base alloy does not result.

Experiments were therefore conducted by us in an attempt to determine acceptable compositions of the nitrided self-fluxing alloy coating exhibiting a hardness which is higher than the hardness of a coating of the similar composition but not subjected to the nitriding process. The experiments have revealed that an increase of the order of 200 in terms of the diamondpyramined hardness number is achieved if the nitrided self-fluxing alloy contains at least 8 percent by weight of chromium.

Thus, in the course of nitriding the coating of the self-fluxing alloy as practiced by the method according to the present invention, the chromium in the alloy reacts with the nitrogen or carbon at the surface of the coating so that monochromium mononitride ($CrN$) and dichromium mononitride ($Cr_2N$) are produced. These reaction products precipitated and distributed in close proximity to the surface of the coating of the self-fluxing alloy with the result that not only monochromium monoboride ($CrB$), dichromium monocarbide ($Cr_2C$), monomolybdenum monoboride ($MoB$), tricobalt monoboride ($Co_3B$) and trinickel monoboride ($Ni_3B$) which were present prior to the nitriding process but also monochromium mononitride and dichromium mononitride were formed.

This and other material characteristics of the product obtained by the method as compared with those of the prior art products will be visibly ascertained from the photographs in the accompanying drawings in which the self-fluxing alloy of the coating shown in FIGS. 1 to 5 is based on chromium, iron, and cobalt and in which.

Figure 4:
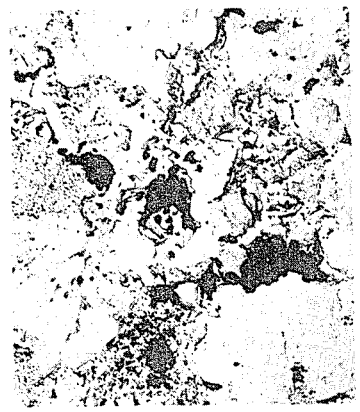
FIG. 4 is an electron-microscopic photograph showing the surface of the self-fluxing alloy coating which is to be nitrided.
Figure 5:
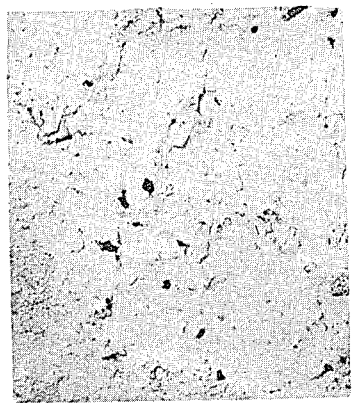
Figure 5:
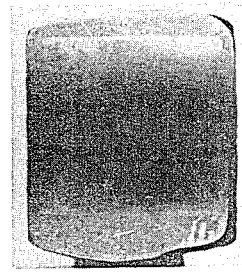
Figure 5:
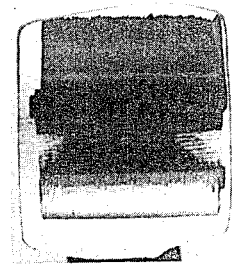

FIG. 5 is a view similar to FIG. 4 but shows the surface of the self-fluxing alloy coating which has been subjected to the nitriding process in a salt bath; and FIGS. 6 to 8 are photographs showing the degree of wear of rocker arms of an automotive engine, wherein (a) of each of FIGS. 6 to 8 shows the rocker arm which is processed by the method according to the present invention and (b) shows the rocker arm of the wear-resistant character which has thus far been commonly used.

Figure 1:
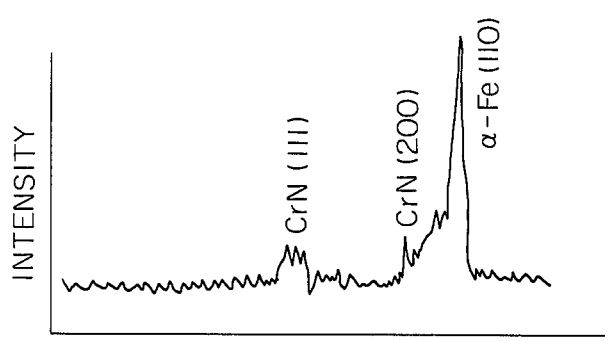
FIG. 1 is an X-ray diffractiometric diagram indicating the existence of the chromium nitride in the self-fluxing alloy coating formed by the method according to the present invention.
Figure 2:
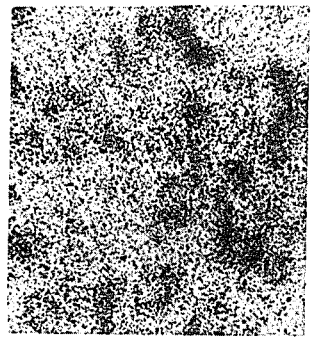
FIG. 2 is an X-ray photograph showing the presence of the chromium dipotassium ($CrK_2$) in the coating of the self-fluxing alloy as observed by the use of an X-ray analyzer.
Figure 3:
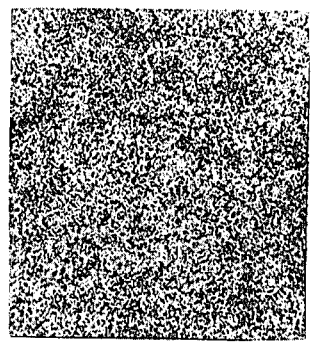
FIG. 3 is view similar to FIG. 2 but now shows the presence of the nitrogen dipotassium ($NK_2$) in the coating.

From the illustrations of FIGS. 1 to 3, it is apparent that the chromium constituent in the coating of the self-fluxing alloy is distributed therein in a segregated form and that the distribution of the nitrogen is the higher where chromium is present in a higher distribution. Inspection of FIGS. 4 and 5, moreover, will reveal that the self-fluxing coating subjected to the nitriding process, the salt bath displays an increased effect. If, thus, the workpiece having the nitrided self-fluxing alloy coating is lubricated, the lubricant can be firmly retained on the surface of the workpiece and, as a consequence, will enhance the antifrictional characteristics of the lubricated surface of the workpiece which is to be subjected to sliding motions. The increased effect of the coating will, furthermore, significantly improve the initial fit of the workpiece, thereby providing a further enhanced antifrictional characteristics the workpiece.

It will be appreciated from the foregoing description that the abrasion resistance of the metal object which is processed by the method according to the present invention is increased particularly at the surface and in the neighbourhood of the surface of the metal object. It is, therefore, preferable for the exploitation of such increased abrasion resistance that the metal object having the self-fluxing alloy coating be subjected to the nitriding process after the workpiece has been machined to the final shape.

The self-fluxing alloy applicable to the method according to the present invention should be selected from those which are not based on iron and should preferably contain at least 8 perecnt of chromium as a constituent. The experiments have revealed that the upper limit of the proportion of the chromium constituent should be approximately 35 perecnt and contain silicon in a certain proportion. Preferred examples of such a self-fluxing alloy are as following:

(a) Ni-Cr based, containing 17% of chromium, 4.4% of silicon and 4.0% of iron.

(b) Co-Fe-Cr based, containing 27% of chromium and 1.8% of silicon.

(c) Co based, containing 20% of chromium and 4.0% of silicon.

(d) WC based, containing 11% of chromium and 2.5% of silicon.

The features and advantages of the metal object processed by the method according to the present invention will be understood more clearly from the following description of the examples of the method and the tests conducted on the metal objects obtained by the exemplified methods.

EXAMPLES

Four identical rocker arms of steel for an internal combustion engine were fabricated and coating by spraying fine molten particles of self-fluxing alloys of different compositions. The compositions of the self-fluxing alloys were as following:

Ni-Cr based (specimen A), containing 70% Ni, 17% Cr, 3.5% B, 4.4% Si, 0.6% C, 2.0% Mo, 4.0% Fe and other elements.

Co-Fe-Cr based (specimen B), containing 3.2% Co, 30% Fe, 27% Cr, 3.0% B, 1.8% Si, 3.3% C, 2.0% W, 7.0% Mo and other elements.

Co based (specimen C), containing 40% Co, 26% Ni, 20% Cr, 3.0% B, 4.0% Si, 5.0% Mo and other elements.

WC based (specimen D), containing 35% WC, 46% Ni, 11% Cr, 2.5% B, 2.5% Si, 2.5% Fe, 0.5% C and other elements.

The coating of the self-fluxing alloys of the above enumerated compositions was then subjected to melting treatment at a temperature of about 1,050° C. and thereafter to the nitriding process in a bath containing potassium cyanide (KCN) and heated to a temperature ranging from 520° C. to 570° C. For the sake of comparison, other rocker arms such as the prior art products were prepared which had the coatings of the self-fluxing alloys of the above specified compositions but which were not subjected to the nitriding process.

The rocker arms thus prepared were incorporated in four-cylinder internal combustion engines of the same type and tests were conducted with those engines under actual driving conditions. It is, in this instance, to be noted that the rocker arm of the internal combustion engine is an abutment member for a cam of an intake or exhaust valve and is thus subjected to serious frictional motions during the operation of the engine. The results of these tests are tabulated below, wherein the abbrevations "IN" and "EX" refer to the locations of the tested rocker arms which were used for the intake and exhaust valves, respectively, and the numerals 1 to 4 prefixed thereto indicate the order in operation of the engine cylinders in which the particular valves were incorporated. Thus, "1IN" refer to the location of the rocker arm which was used for the intake valve for the first engine cylinder while "2EX" indicate that the rocker arm was associated with the exhaust valve of the second engine cylinder. The wear ratings of the rocker arms are indexed by "++" meaning "excellent," "+" meaning "acceptable" and "—" meaning "unacceptable."

Test I

Tests were conducted with an internal combustion engine using the rocker arms of the specimens A and B.

The engine was driven at a relatively low speed with use of a lubricant having a relatively low viscosity. The testing conditions were as following:

Operating hours _____ 48 hours.
Engine revolution speed _____ 1100 r.p.m.
Lubricant temperature _____ 55–65° C.
Lubricant working pressure _____ 3.5–4.0 kgs./cm.²

The results of the tests are indicated in Table I.

TABLE I

| | Specimen A | | Specimen B | |
|---|---|---|---|---|
| | Invented | Prior art | Invented | Prior art |
| Location | 1EX 1IN | 2EX 2IN | 3EX 3IN | 4EX 4IN |
| Wear rating | ++ ++ | + — | ++ ++ | + + |

The surface of the specimen A processed by the method according to the present invention and those of the prior art are illustrated in (a) and (b), respectively, of FIG. 6, while the surface of the specimen B obtained in accordance with the invention and those of the prior art are shown in (a) and (b), respectively, of FIG. 7.

Test II

The engine using the rocker arms of the specimens C and D were driven for testing under the same conditions as in Test I. The results of the tests are indicated in Table II.

TABLE II

| | Specimen C | | Specimen D | |
|---|---|---|---|---|
| | Invented | Prior art | Invented | Prior art |
| Location | 1EX 1IN | 2EX 2IN | 3EX 3IN | 4EX 4IN |
| Wear rating | ++ ++ | — — | ++ ++ | + — |

Test III

High-speed endurance tests were conducted with internal combustion engines using the rocker arms of the specimens A and B under the following conditions:

Operating hours _____ 100 hours.
Engine revolution speed _____ 5000 r.p.m.
Lubricant temperature _____ 83–93° C.
Lubricant working pressure _____ 3.5–4.5 kgs./cm.²

The results of the these tests are tabulated in Table III.

TABLE III

| | Specimen A | | Specimen B | |
|---|---|---|---|---|
| | Invented | Prior art | Invented | Prior art |
| Location | 1EX 1IN | 2EX 2IN | 3EX 3IN | 4EX 4IN |
| Wear rating | ++ ++ | + + | ++ ++ | + + |

The surfaces of the rocker arms of the specimen B processed by the method according to the present invention and of the prior art are illustrated in (a) and (b) of FIG. 8.

The same tests were further conducted with the specimens which were subjected to the nitriding process in an atmospheric furnace, achieving substantially similar results. The nitriding process was carried out under the following conditions:

Temperature _____ 480–650° C.
Process hours _____ 5–100 hours.
Type of atmosphere _____ Ammonium gas.

It was ascertained by these tests that heating the test pieces to a temperature below 480° C. results in insufficient nitriding of them while satisfactory surface hardness cannot be obtained if the test pieces are heated to a temperature above 650° C.

What is claimed is:

1. A method for preparing a base metal article selected from the group consisting of steel, cast steel, cast iron, copper, copper alloy and nickel alloy having a wear-resistant surface, comprising the steps of spraying onto a surface of said metal article a coating of a self-fluxing alloy comprising a base alloy selected from the group consisting of a nickel-chrome based alloy, a cobalt-iron-chrome based alloy, a cobalt based alloy and a tungsten monocarbide based alloy; said self-fluxing alloy containing about 8% to 35% by weight of chromium and at least one self-fluxing component selected from the group consisting of boron and silicon, melting said coating for eliminating porosity of said coating and for tightly fusing said coating onto said metal article and finally heating said coated metal article to a temperature in the range of 480 to 650° C. in a medium containing nitrogen for nitriding said coating.

2. A method as claimed in Claim 1, further comprising the application of another coating of said self-fluxing alloy to the initially formed coating by means of weld-spraying and nitriding the second coating together with said initially formed coating.

3. A method as claimed in Claim 1, further comprising carburizing said nitrided coating.

4. A method as claimed in Claim 1, according to which said coating is nitrided by heating to a temperature ranging from 500° C. to 650° C. in a liquid heat treatment furnace.

5. A method as claimed in Claim 1, according to which said coating is nitrided by heating to a temperature ranging from 480° C. to 650° C. in a gas atmosphere furnace.

References Cited

UNITED STATES PATENTS

| 2,936,229 | 5/1960 | Shepard | 75—171 |
| 3,677,832 | 7/1972 | Van Thyne et al. | 148—20.3 |
| 3,180,564 | 4/1965 | Fuhrmann et al. | 418—178 |
| 3,245,387 | 4/1966 | Froede | 418—179 |
| 3,428,442 | 2/1969 | Yurasko | 117—105.2 |

FOREIGN PATENTS

| 1,811,916 | 6/1970 | Germany | 418—113 |
| 867,455 | 5/1961 | Great Britain | 117—105.2 |
| 907,355 | 10/1962 | Great Britain | 117—46 FS |

CHARLES N. LOVELL, Primary Examiner

U.S. Cl. X.R.

29—196.6, 199; 117—62, 71, 105.2; 148—16.5, 16.6, 20.3, 31.5; 418—178, 179